United States Patent
Ishizuka et al.

(10) Patent No.: US 7,011,895 B2
(45) Date of Patent: Mar. 14, 2006

(54) INORGANIC-ORGANIC COMPOSITE-TREATED ZINC-PLATED STEEL SHEET

(75) Inventors: Kiyokazu Ishizuka, Himeji (JP); Hidetoshi Shindo, Chiyoda-ku (JP); Koichi Saito, Shinagawa-ku (JP); Motohiro Sasaki, Kawasaki (JP); Atsuhiko Tounaka, Kawasaki (JP)

(73) Assignee: Nippon Steel Corporation, Tokyo (JP)

(*) Notice: Subject to any disclaimer, the term of this patent is extended or adjusted under 35 U.S.C. 154(b) by 4 days.

(21) Appl. No.: 10/874,755

(22) Filed: Jun. 24, 2004

(65) Prior Publication Data

US 2005/0037228 A1 Feb. 17, 2005

(30) Foreign Application Priority Data

Jul. 8, 2003 (JP) .............................. 2003-272105

(51) Int. Cl.
*B32B 15/04* (2006.01)
*B32B 15/08* (2006.01)
*B32B 15/18* (2006.01)

(52) U.S. Cl. ...................... 428/659; 428/457; 428/704; 428/219; 428/472; 428/472.3

(58) Field of Classification Search ................ 428/681, 428/684, 659, 457, 472.3, 704, 219, 340, 428/470, 472, 660

See application file for complete search history.

(56) References Cited

U.S. PATENT DOCUMENTS 6,720,078 B1 * 4/2004 Isizuka et al. ............... 428/418
2003/0072962 A1 * 4/2003 Matsuzaki et al. .......... 428/623

FOREIGN PATENT DOCUMENTS

| JP | 2001-105528 | 4/2001 |
| JP | 2001-131763 | 5/2001 |
| WO | WO 01/34873 A1 * | 5/2001 |

* cited by examiner

*Primary Examiner*—Michael E. Lavilla
(74) *Attorney, Agent, or Firm*—Westerman, Hattori, Daniels & Adrian LLP

(57) ABSTRACT

The present invention is intended to provide an inorganic-organic composite-treated zinc-plated steel sheet whose treated coatings do not contain any hazardous chromate and which is excellent in corrosion resistance after alkaline degreasing and coating adhesion.

An inorganic-organic composite-treated zinc-plated steel sheet
which has a zinc phosphate coating, in a coating weight of 0.3 to 5 $g/m^2$, on the zinc-plated steel sheet surface and, thereon, a post-treatment coating, in a coating weight of 0.01 to 1 $g/m^2$, containing an organic resin (A), a zirconium compound (B), an inorganic corrosion inhibitor (C) and an organic corrosion inhibitor (D).

11 Claims, No Drawings

INORGANIC-ORGANIC COMPOSITE-TREATED ZINC-PLATED STEEL SHEET

TECHNICAL FIELD

This invention relates to an inorganic-organic composite-treated zinc-plated steel sheet.

BACKGROUND ART

In the art, zinc-plated steel sheets intended for use in the fields of automobiles, household electric appliances, building materials and the like are generally subjected to phosphate treatment or chromate treatment for the purpose of improving their corrosion resistance and coating adhesion, and the like. In particular, the process comprising chromate sealing treatment following zinc phosphate treatment is in wide use since it is highly effective in improving corrosion resistance and coating adhesion. However, with the recent background of the increasing interest in environmental problems, it is desired that a surface treatment technology without using any highly toxic chromate be developed. Thus, the following technologies have been proposed.

A zinc phosphate composite-treated steel sheet has been disclosed which has, as a first layer on the zinc-plated steel sheet surface, a zinc phosphate coating with a coating weight of 0.2 to 2.5 $g/m^2$ and containing at least one metal selected from among nickel, manganese and magnesium and, thereon, as a second layer, an organic coating based on at least one organic resin selected from among ethylene resins, epoxy resins, urethane resins and acrylic resins (cf. e.g. Japanese Kokai Publication 2001-105528, page 2).

An organic composite-treated zinc-plated steel sheet has been disclosed which has a zinc plating coating, a zinc phosphate coating of not less than 0.3 $g/m^2$ and an organic coating of 0.3 to 2 $g/m^2$ as formed on the steel sheet surface in that order, wherein the zinc phosphate coating contains Mg, the Mg/P ratio (by weight) in the zinc phosphate coating is not less than 0.15 and the amount of Mg is not less than 20 $mg/m^2$ (cf. e.g. Japanese Kokai Publication 2001-131763, page 2).

The zinc-plated steel sheets treated in such a manner are generally pressed for shaping and then subjected to alkaline degreasing and washing and are used either as such or after coating. In the automobile field, in particular, the car bodies in which the zinc-plated steel sheets treated in the manner mentioned above are used are conveyed on a coating line and are thus subjected successively to alkaline degreasing, zinc phosphate treatment, electrodeposition coating, intermediate coating, and top coating. Therefore, the coatings formed on the zinc-plated steel sheets are required to be firm and strong so that they may not be dissolved or deteriorated even upon contact with an alkaline degreasing solution and a zinc phosphate treatment solution.

However, when the zinc phosphate composite-treated steel sheets and organic composite-treated zinc-plated steel sheets obtained by such methods as mentioned above and the like methods are subjected to alkaline degreasing treatment after shaping thereof, the coatings are dissolved or deteriorated, so that poor corrosion resistance after the degreasing treatment and poor coating adhesion will result.

In view of the state of the art as discussed above, it is an object of the present invention to provide an inorganic-organic composite-treated zinc-plated steel sheet whose treated coatings do not contain any hazardous chromate and which is excellent in corrosion resistance after alkaline degreasing and coating adhesion.

SUMMARY OF THE INVENTION

The present invention provides an inorganic-organic composite-treated zinc-plated steel sheet
which has a zinc phosphate coating, in a coating weight of 0.3 to 5 $g/m^2$, on the zinc-plated steel sheet surface and, thereon, a post-treatment coating, in a coating weight of 0.01 to 1 $g/m^2$, containing an organic resin (A), a zirconium compound (B), an inorganic corrosion inhibitor (C) and an organic corrosion inhibitor (D).

Said zinc phosphate coating preferably contains magnesium, the magnesium/phosphorus (weight ratio) in said zinc phosphate coating being not less than 0.1 and the amount of magnesium being not less than 20 $mg/m^2$.

Said post-treatment coating preferably has the following composition: 10 to 70% by weight of the organic resin (A), 3 to 30% by weight of the zirconium compound (B), 10 to 50% by weight of the inorganic corrosion inhibitor (C) and 2 to 40% by weight of the organic corrosion inhibitor (D).

Said organic resin (A) is preferably an epoxy resin and/or a modified epoxy resin.

Said inorganic corrosion inhibitor (C) is preferably at least one species selected from the group consisting of silica particles, phosphoric acid compounds and niobium compounds.

Said organic corrosion inhibitor (D) is preferably at least one species selected from the group consisting of thiocarbonyl group-containing compounds, sulfide group-containing compounds and guanidyl group-containing compounds.

DETAILED DESCRIPTION OF THE INVENTION

In the following, the present invention is described in detail.

The inorganic-organic composite-treated zinc-plated steel sheet of the invention has, on the surface of the zinc-plated steel sheet, a zinc phosphate coating and further thereon, a post-treatment coating. These two coatings which the sheet has contribute to improvements in corrosion resistance after alkaline degreasing and coating adhesion.

The inorganic-organic composite-treated zinc-plated steel sheet of the invention has, on the surface of the zinc-plated steel sheet, a zinc phosphate coating as a first coating. This coating can provide the zinc-plated steel sheet with certain extents of corrosion resistance, coating adhesion and lubricity.

The zinc phosphate coating can be formed by means of a per se known zinc phosphating solution containing the phosphate ion and zinc ion.

The zinc ion resource is not particularly restricted but may be any zinc-containing compound. For example, there may be mentioned zinc, zinc oxide, zinc carbonate, zinc nitrate, and the like.

The phosphate ion resource is not particularly restricted but may be any phosphoric moiety-containing compound. For example, there may be mentioned phosphoric acid, phosphorus pentoxide, sodium dihydrogen phosphate, and the like. It may contain an appropriate amount of some other component used in the zinc phosphating solution.

The above-mentioned zinc phosphate coating preferably contains magnesium. This can lead to a further improvement in corrosion resistance of the zinc-plated steel sheets and an improvement in adhesion to the post-treatment coating.

In cases where the zinc phosphate coating contains magnesium, the coating preferably has a magnesium/phosphorus ratio in the coating (weight ratio between magnesium and phosphorus in the coating) of not less than 0.1. When the ratio is less than 0.1, the addition of magnesium may not result in a substantial improvement in corrosion resistance. A more preferred ratio is 0.15 to 0.5.

In cases where the zinc phosphate coating contains magnesium, the zinc phosphate coating preferably has an amount of magnesium therein of not less than 20 mg/m$^2$. When the amount is less than 20 mg/m$^2$, no improvement in corrosion resistance may possibly be achieved. More preferably, the amount is 30 to 70 mg/m$^2$.

The zinc phosphate coating is formed in a coating weight of from a lower limit of 0.3 g/m$^2$ to an upper limit of 5 g/m$^2$. When the coating weight is less than 0.3 g/m$^2$, unsatisfactory corrosion resistance may result and, when it exceeds 5 g/m$^2$, coating peeling may occur upon severe treatment. The lower limit is more preferably 0.5 g/m$^2$, and the upper limit is more preferably 2.5 g/m$^2$.

Usable as the treatment solution for forming the zinc phosphate coating is a commercial treatment solution containing phosphate ions and zinc ions as main constituents, with metal ions other than zinc ions, nitrate ions, fluoride ions and the like ions added according to need. For incorporation of magnesium in the zinc phosphate coating, a bath resulting from addition of magnesium nitrate to the above zinc phosphate treatment solution is judiciously used. The amount of magnesium and the magnesium/phosphorus ratio in the coating can be controlled through the level of addition of magnesium nitrate.

As regards the method of treating the zinc-plated steel sheet with the above zinc phosphating solution, the zinc phosphate coating can be formed either in the manner of reaction type treatment or in the manner of coating treatment. In the case of reaction type treatment, the zinc phosphate coating can be formed, for example, by bringing the zinc-plated steel sheet after degreasing, water washing and surface conditioning into contact with the above zinc phosphate treatment solution, followed by washing with water and drying. The coating weight of the zinc phosphate coating can be adjusted by varying the treatment time and/or treatment temperature, for instance.

The coating type treatment comprises, for example, applying the zinc phosphate treatment solution, in an amount corresponding to the required coating weight, to the zinc-plated steel sheet by the roll coating method, or applying the treatment solution to the steel sheet by dipping or spraying and then adjusting the coating weight to the required level by roll squeezing. After application of the zinc phosphate treatment solution thereto, the treated zinc-plated steel plate is dried using a drying oven and the like whereby the zinc phosphate coating is formed.

The inorganic-organic composite-treated zinc-plated steel sheet of the invention has, as a second coating formed on the above zinc phosphate coating, a post-treatment coating containing an organic resin (A), a zirconium compound (B), an inorganic corrosion inhibitor (C) and an organic corrosion inhibitor (D). The formation of the post-treatment coating on the above zinc phosphate coating results in improvements in corrosion resistance after alkaline degreasing and coating adhesion.

Thus, zinc-plated steel sheets with the zinc phosphate coating alone formed thereon may have sites devoid of the compact zinc phosphate coating on the steel sheet surface, leading to poor corrosion resistance. When zinc-plated steel sheets having only an inorganic coating, such as zinc phosphate, as formed thereon are coated, they may show an unsatisfactory degree of coating adhesion in adhesion testing following a bending or water resistance test. On the contrary, the inorganic-organic composite-treated zinc-plated steel sheet of the invention has a further post-treatment coating formed on the zinc phosphate coating and containing an organic resin (A), a zirconium compound (B), an inorganic corrosion inhibitor (C) and an organic corrosion inhibitor (D) and, in this manner, the whole surface of the steel sheet, inclusive of those sites on which there are devoid of the compact zinc phosphate coating, is covered uniformly with a firm and strong coating. Therefore, even after further shaping and alkaline degreasing treatment thereof, the inorganic-organic composite-treated zinc-plated steel sheet of the invention is prevented from its post-treatment coating formed being deteriorated or dissolved upon degreasing treatment and, as a result, good corrosion resistance after degreasing and coating adhesion can be obtained.

The post-treatment coating can be formed by using a post-treatment composition containing an organic resin (A), a zirconium compound (B), an inorganic corrosion inhibitor (C) and an organic corrosion inhibitor (D).

When the organic resin (A) is contained in the post-treatment coating, the post-treatment coating can be formed uniformly and an inorganic corrosion inhibitor (C) and an organic corrosion inhibitor (D) can be appropriately fixed in the coating, and the topcoat adhesion can also be improved.

The organic resin (A) is not particularly restricted but may be an acrylic resin, vinyl resin, polyester resin, polyurethane resin, epoxy resin or the like, for instance. Preferably, it contains an epoxy resin and/or a modified epoxy resin as an essential component because of the improvement in adhesion to the top coating composition or electrodeposition coating composition as caused thereby and of the ability thereof to adequately fix an inorganic corrosion inhibitor (C) and an organic corrosion inhibitor (D), which is to be more specifically described later herein, in the coating.

As the epoxy resin, there may be mentioned, for example, bisphenol A-based epoxy resins, bisphenol F-based epoxy resins, resorcinol-based epoxy resins, phenol novolak-based epoxy resins and like epoxy resins.

The modified epoxy resin is not particularly restricted but may be one resulting from modification of an epoxy resin in the conventional manner. Thus, there may be mentioned, for example, epoxy resins modified with an acrylic resin or urethane resin, and the like.

The content of the organic resin (A) in the post-treatment coating is preferably 10% by weight (lower limit) to 70% by weight (upper limit). When it is less than 10% by weight, any firm and strong coating may not be formed; further, the coating adhesion may decrease. When it exceeds 70% by weight, the corrosion resistance after alkaline degreasing and coating adhesion may decrease. The lower limit is more preferably 20% by weight, and the upper limit is more preferably 60% by weight.

The zirconium compound (B) is a reactive one and, therefore, can improve the alkali resistance and solvent resistance of the post-treatment coating and further can improve the adhesion thereof to the zinc phosphate coating and the plated metal substrate.

The reason why the zirconium compound (B) contained in the post-treatment coating can improve the alkali resistance and solvent resistance of the coatings is presumably that the formed post-treatment coating becomes firm and strong because of the function of the zirconium compound (B) to react with the functional group in the organic resin (A), for example carboxyl group, hydroxyl group and/or the like to thereby cause crosslinking. The reason why the adhesion to the zinc phosphate coating and plated metal substrate is improved is presumably that the zirconium compound (B) improves the adhesion of the post-treatment coating to the zinc phosphate coating and plated metal substrate via its strong interaction, through hydrogen bonding and the like with the zinc phosphate coating and plated metal substrate as well.

The zirconium compound (B) is not particularly restricted but may be any zirconium compound reactive with carboxyl and/or hydroxyl groups. Zirconium compounds soluble in water or an organic solvent are preferred, however. From the viewpoint of compatibility with the organic resin (A), inorganic corrosion inhibitor (C) and organic corrosion inhibitor (D), water-soluble zirconium compounds are more preferred.

Among the zirconium compounds (B), those compounds which are soluble in water and can react with carboxyl and/or hydroxyl groups are not particularly restricted. From the reactivity viewpoint, however, zirconium ammonium carbonate is preferred.

The content of the zirconium compound (B) in the post-treatment coating is preferably 3% by weight (lower limit) to 30% by weight (upper limit). If it is less than 3% by weight, the alkali resistance and solvent resistance and the adhesion to the zinc phosphate coating and plated metal substrate may decrease and, when it exceeds 30% by weight, the coating adhesion may decrease. The lower limit is more preferably 5% by weight, and the upper limit is more preferably 20% by weight.

By causing the inorganic corrosion inhibitor (C) to be contained in the post-treatment coating, it becomes possible to allow the formation of a stable metal corrosion product in corrosive circumstances, whereby the progress of corrosion can be prevented and the coatings can be provided with good corrosion resistance.

The inorganic corrosion inhibitor (C) is not particularly restricted but may be any inorganic compound having corrosion inhibitor effect. From the higher corrosion preventing effect viewpoint, however, silica particles, phosphoric acid compounds and niobium compounds are preferred.

The above-mentioned silica particles are not particularly restricted but fine silica particles with a primary particle diameter of 5 to 50 nm, for example colloidal silica particles, fumed silica particles, ion exchange silica particles and the like, are preferred since the post-treatment coating is thin. As commercial products, there may be mentioned, for example, Snowtex O, Snowtex N, Snowtex C and Snowtex IPA-ST (Nissan Chemical Industries, Ltd.), Adelite AT-20N and AT-20A (Asahi Denka Co., Ltd.), Aerosil 200 (Nippon Aerosil Co., Ltd) and the like.

The phosphoric acid compounds are not particularly restricted but may be any of phosphorus-containing compounds, and there may be mentioned, for example, phosphoric acids such as orthophosphoric acid, metaphosphoric acid, pyrophosphoric acid, triphosphoric acid and tetraphosphoric acid; phosphonic acids such as aminotri(methylenephosphonic acid), 1-hydroxyethylidene-1,1-diphosphonic acid, ethylenediaminetetra(methylenephosphonic acid) and diethylenetriaminepenta(methylenephosphonic acid); organophosphoric acids such as phytic acid; salts thereof; and the like. These may be used singly or two or more of them may be used in combination.

The niobium compounds are not particularly restricted but may be any of niobium-containing compounds, and there may be mentioned, for example, niobium oxide, niobic acid and salts thereof, fluoroniobic acid salts, fluorooxoniobic acid salts, and the like. These may be used singly or two or more of them may be used in combination.

The content of the inorganic corrosion inhibitor (C) is preferably 10% by weight (lower limit) to 50% by weight (upper limit) in the post-treatment coating. When it is less than 10% by weight, the progress of corrosion may not be inhibited and, if it exceeds 50% by weight, the coating adhesion may become decreased. The lower limit is more preferably 15% by weight, and the upper limit is more preferably 40% by weight.

By causing the organic corrosion inhibitor (D) to be contained in the post-treatment coating, it becomes possible to form thin films showing good corrosion resistance. In particular, the thiocarbonyl group-containing compounds, sulfide group-containing compounds and guanidyl group-containing compounds which are more specifically described below have high levels of affinity for the zinc ion and are therefore effective in preventing zinc-coated steel sheets from becoming covered with white rust.

The organic corrosion inhibitor (D) is not particularly restricted but may be an organic compound effective in corrosion inhibition. Because of the ability to provide the thin film with good corrosion resistance, however, at least one compound selected from the group consisting of thiocarbonyl group-containing compounds, sulfide group-containing compounds and guanidyl group-containing compounds is preferred.

The thiocarbonyl group-containing compounds are preferably ones represented by the general formula (1) given below. They can improve the corrosion resistance of the zinc-plated steel sheet.

In the above formula, X and Y are the same or different and each represents H, OH, SH or NH$_2$ or represents a hydrocarbon group containing 1 to 15 carbon atoms which may have OH, SH or NH$_2$ as a substituent and may contain —O—, —NH—, —S—, —CO— or —CS—; X and Y may be combined with each other to form a ring.

The thiocarbonyl group-containing compounds represented by the general formula (1) are compounds having the thiocarbonyl group of the following formula (I):

and, among them, those compounds in which the thiocarbonyl group is bound to a nitrogen atom or oxygen atom represented by the following formula (II):

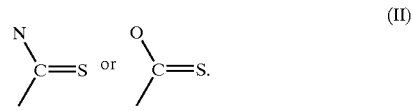

A compound capable of forming a thiocarbonyl group-containing compound in an aqueous solution or in the presence of an acid or alkali can also be used.

As examples of the thiocarbonyl group-containing compounds, there may be mentioned thiourea represented by the following formula (III):

(III)

and derivatives thereof, for example methylthiourea, dimethylthiourea, trimethylthiourea, ethylthiourea, diethylthiourea, 1,3-dibutylthiourea, phenylthiourea, diphenylthiourea, 1,3-bis(dimethylaminopropyl)-2-thiourea, ethylenethiourea, propylenethiourea, thiopental, thiocarbazide, thiocarbazones, thiocyanuric acids, thiohydantoin, 2-thiouracil, 3-thiourazole; thioamide compounds represented by the following formula (IV):

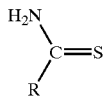

(IV)

and derivatives thereof, for example thioformamide, thioacetamide, thiopropionamide, thiobenzamide, thiocarbostyril, thiosaccharin; thioaldehyde compounds represented by the following formula (V):

(V)

for example thioformaldehyde, thioacetaldehyde; carbothioic acids represented by the following formula (VI):

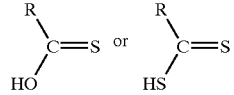

(VI)

and salts thereof, for example thioacetic acid, thiobenzoic acid, dithioacetic acid, sodium methyldithiocarbamate, sodium dimethyldithiocarbamate, dimethyldithiocarbamic acid triethylamine salt, sodium diethyldithiocarbamate, pentamethylenedithiocarbamic acid piperidine salt, pipecolyldithiocarbamic acid pipecoline salt, potassium O-ethyl xanthate; thiocarbonic acids represented by the following formula (VII):

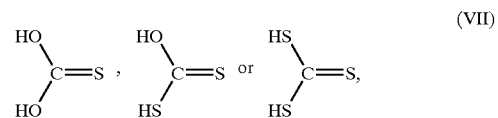

(VII)

for example, ethylene tridithiocarbonate; and other compounds having the above structure (I), for example thiocoumazone, thiocoumothiazone, thionine blue J, thiopyrone, thiopyrine, thiobenzophenone and the like. These thiocarbonyl group-containing compounds may be used singly or two or more of them may be used in combination. Among the thiocarbonyl group-containing compounds mentioned above, those insoluble in water are each once dissolved in an alkaline solution and then incorporated into the post-treatment composition.

Preferably, the above thiocarbonyl group-containing compound is a polymer having a side chain represented by the general formula (2) given below and a weight average molecular weight of not higher than 1,000,000. When it is such a polymer, the zinc-plated steel sheet can be more improved in corrosion resistance.

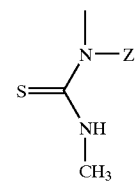

(2)

In the above formula, Z represents —$(CH_2)_a$COO-A in which a is an integer of 1 to 8 and A represents ammonia, an amine or a univalent metal ion.

The polymer having the side chain of general formula (2) is not particularly restricted but there may be mentioned polymers represented by the general formula (3) given below.

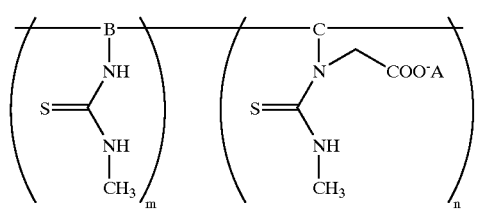

(3)

In the above formula, m and n each is such an integer that the polymer may acquire a weight average molecular weight of not higher than 1,000,000, with the ratio n/n+m of 0.2 to 0.8, preferably 0.3 to 0.6. If this ratio is less than 0.2, the water solubility of the polymer will decrease. Conversely, if it exceeds 0.8, the corrosion resistance will decrease. The n A groups may be the same or different, and B and C each represents a main chain of the polymer and may be, for example, a group represented by the general formula (4) given below. Unless the side chain binding position is specifically indicated in the general formula (4) given below, the side chain may be bound to any of the carbon atoms. The groups B and C may be the same or different.

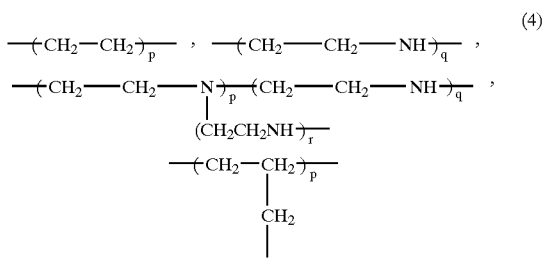

(4)

The symbols p, q and r each represents an integer. Their values are not particularly restricted provided that they cooperatively give a weight average molecular weight of not higher than 1,000,000 to the polymer.

Preferably, the thiocarbonyl group-containing compound is a polymer having a side chain represented by the above general formula (2) and having a weight average molecular weight of not higher than 1,000,000. When the molecular weight exceeds 1,000,000, the viscosity will increase, possibly making it difficult to obtain uniform coatings.

The sulfide group-containing compound has the same effect as that of the thiocarbonyl group-containing compound. When it is contained in the post-treatment coating, it can provide the thin film containing it with good corrosion resistance.

The sulfide group-containing compound is not particularly restricted but may be any sulfide group-containing compound. From the corrosion resistance viewpoint, however, a hydroxyl group-containing sulfide compound is preferred.

The hydroxyl group-containing sulfide compound is not particularly restricted but may be any of hydroxyl group- and sulfide group-containing compounds, such as, for example, 1,2-bis(2-hydroxyethylthio)ethane, 1,4-bis(2-hydroxyethylthio)butane, 1,3-bis(2-hydroxyethylthio)-2-propanol, 3-(2-aminophenylthio)-1,2-propanediol, sodium (2,3-dihydroxypropylthio)-2-methylpropanesulfonate, sodium (2,3-dihydroxypropylthio)propanesulfonate, 3-(2-hydroxyethylthio)-2-hydroxypropylmercaptan, and 3-(2-aminophenylthio)-2-hydroxypropylmercaptan.

The guanidyl group-containing compound has the same effect as that of the thiocarbonyl group-containing compound. When it is contained in the post-treatment coating, it can provide the thin film containing it with good corrosion resistance.

The guanidyl group-containing compound is not particularly restricted but may be any guanidyl group-containing compound. Preferred, however, are compounds represented by the formula (5) given below. These can improve the corrosion resistance of the zinc-plated steel sheet.

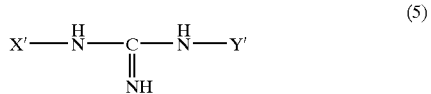

(5)

In the above formula, X' and Y' may be the same or different and each represents H, $NH_2$, a phenyl group or a methylphenyl (tolyl) group, or may contain H, $NH_2$, a phenyl group or a methylphenyl (tolyl) group as a substituent and, further, may contain —C(=NH)—, —CO— or —CS—.

As examples of the guanidyl group-containing compound, there may be mentioned guanidine, aminoguanidine, guanylthiourea, 1,3-di-o-tolylguanidine, 1-o-tolylbiguanide, 1,3-diphenylguanidine and the like.

Such guanidyl group-containing compounds may be used singly or two or more of them may be used in combination.

As regards the content of at least one compound selected from the group consisting of the above-mentioned thiocarbonyl group-containing compounds, sulfide group-containing compounds and guanidyl group-containing compounds (the total content, in the post-treatment coating, of the thiocarbonyl group-containing compound, sulfide group-containing compound and/or guanidyl group-containing compound selected), the lower limit thereto is preferably set at 2% by weight, and the upper limit is preferably set at 40% by weight. If the content in question is lower than 2% by weight, the coating, when it is thin, may be unsatisfactory in corrosion resistance and, if it exceeds 40% by weight, the coating adhesion may decrease. The lower limit is more preferably 5% by weight, and the upper limit is more preferably 35% by weight.

In the post-treatment coating, there may further incorporated one or more additives, such as pigments, dyes, surfactants and lubricants. Usable as the pigments are inorganic pigments, such as zinc oxide (ZnO) and carbon black, organic color pigments and the like, for instance. As the surfactants, there may be mentioned nonionic surfactants, anionic surfactants and the like, for instance. Usable as the lubricants are, for example, polyethylene waxes, modified polyethylene waxes, tetrafluoroethylene resins and the like.

The post-treatment coating is formed to attain a coating weight of 0.01 $g/m^2$ (lower limit) to 1 $g/m^2$ (upper limit). If the coating weight is less than 0.01 $g/m^2$, no improvement may be produced in corrosion resistance after alkaline degreasing and/or in coating adhesion. When it exceeds 1 $g/m^2$, the electric conductivity will lower, which may disturb the weldability and/or electrodeposition coating process. The lower limit is more preferably 0.03 $g/m^2$, and the upper limit is more preferably 0.7 $g/m^2$.

The post-treatment coating can be formed by applying the post-treatment composition to the zinc-plated steel sheet having the zinc phosphate coating formed thereon. The method of application is not particularly restricted but there may be mentioned, for example, roll coating, air spraying, airless spraying, dipping and the like. Preferably, the substrate to be coated is heated in advance or the substrate after coating is heated and dried so that the degree of crosslinking of the coating formed from the post-treatment composition may be increased. In heating the substrate, the peak metal temperature level is preferably within the range of 50° C. (lower limit) to 250° C. (upper limit). The lower limit is preferably 70° C., and the upper limit is preferably 200° C. When the peak metal temperature is less than 50° C., the rate of water evaporation is slow, hence no sufficient level of film formability will be obtained and the solvent resistance and alkali resistance will decrease. When, conversely, it exceeds 250° C., the resin will be thermally decomposed, and the solvent resistance and alkali resistance will decrease.

The zinc-plated steel sheet to be used in producing the inorganic-organic composite-treated zinc-plated steel sheet of the invention is not particularly restricted but there may be mentioned, for example, zinc-plated or zinc-based alloy-plated steel sheets obtained by zinc-based electroplating, zinc-based hot dip plating or zinc-based vapor deposition plating, for instance, such as zinc-plated steel sheets, zinc/nickel-plated steel sheets, zinc/iron-plated steel sheets, zinc/chromium-plated steel sheets, zinc/manganese-plated steel sheets, zinc/aluminum-plated steel sheets, and zinc/magnesium-plated steel sheets.

The inorganic-organic composite-treated zinc-plated steel sheet of the invention, which is obtained by forming a zinc phosphate coating, in a coating weight of 0.3 to 5 g/m$^2$, on the zinc-plated steel sheet surface and forming thereon a post-treatment coating, in a coating weight of 0.01 to 1 g/m$^2$, containing an organic resin (A), a zirconium compound (B), an inorganic corrosion inhibitor (C) and an organic corrosion inhibitor (D), can have firm and strong coatings formed uniformly all over the surface of the steel sheet. As a result, when the inorganic-organic composite-treated zinc-plated steel sheet of the invention is further shaped and subjected to alkaline degreasing treatment, the post-treatment coating formed on the inorganic-organic composite-treated zinc-plated steel sheet can be prevented from being deteriorated or dissolved upon degreasing treatment. Therefore, the inorganic-organic composite-treated zinc-plated steel sheet of the invention is excellent in corrosion resistance after alkaline degreasing and in coating adhesion.

Since the inorganic-organic composite-treated zinc-plated steel sheet of the invention has the constitution described hereinabove, the zinc-plated steel sheet excellent in such characteristics as corrosion resistance after alkaline degreasing and coating adhesion can be obtained without requiring any chromate. Furthermore, the inorganic-organic composite-treated zinc-plated steel sheet can be produced by an easy and simple production method and is advantageous from the cost viewpoint, and can be appropriately used in such various fields of application as automobiles, household electric appliances and building materials.

The inorganic-organic composite-treated zinc-plated steel sheet of the invention is excellent in corrosion resistance after alkaline degreasing and in coating adhesion and therefore can be used in such fields of application as automobiles, household electric appliances and building materials.

BEST MODE FOR CARRYING OUT THE INVENTION

The following examples illustrate the present invention in further detail. These examples are, however, by no means limitative of the scope of the invention. In the examples, "part(s)" means "part(s) by weight", unless otherwise specified.

(Method of Treatment of Zinc-plated Steel Sheets)

Test sheets were prepared using the original plated sheets specified in Table 1 and subjecting them to alkaline degreasing, and then to zinc phosphate treatment and post-treatment.

After surface conditioning treatment using a commercial TiO$_2$ colloid preparation, the zinc phosphate treatment was carried out using the baths prepared as specified in Table 2 by the spraying technique at a temperature of 45° C. for a treatment period of 1 to 10 seconds, further followed by washing with water and drying.

For the post-treatment, the aqueous treatment compositions containing the ingredients specified in Table 3 in an amount of 10 parts by weight was applied using a roll coater.

TABLE 1

| Designation | Steel sheets |
|---|---|
| EG20 | electro-galvanized steel sheets (Zn coating weight per side 20 g/m$^2$) |
| EG30 | electro-galvanized steel sheets (Zn coating weight per side 30 g/m$^2$) |
| GI70 | hot dip galvanized steel sheets(Zn coating weight per side 70 g/m$^2$) |

TABLE 2

| | Concentration in bath, g/l | | | | |
|---|---|---|---|---|---|
| No. | Zn | Ni | Mn | Mg | PO$_4$ |
| 1 | 1.1 | 0.5 | — | — | 10.5 |
| 2 | 0.7 | 2.8 | — | 0.1 | 6.5 |
| 3 | 2.0 | 4.0 | — | 22 | 11.0 |
| 4 | 2.5 | 2.0 | 2.5 | 11 | 14.0 |

TABLE 3

| | | No. | 1 | 2 | 3 | 4 | 5 | 6 | 7 | 8 |
|---|---|---|---|---|---|---|---|---|---|---|
| Resin | | Bisphenol A-based epoxy resin | 34 | — | — | — | — | — | — | — |
| | | Acryl-modified epoxy resin (acid value 40) | — | 55 | 32 | — | — | — | 46 | — |
| | | Urethane-modified epoxy resin (acid value 30) | — | — | — | 44 | 26 | — | — | 58 |
| | | Zirconium ammonium carbonate | 12 | 8 | 15 | 10 | 15 | 25 | — | 10 |
| Inorganic rust preventive | | Snowtex N (product of Nissan Chemical) | 15 | 20 | 24 | 24 | 18 | 33 | 15 | 24 |
| | | Diammonium hydrogen phosphate | 12 | 2 | 8 | 14 | 10 | 2 | 12 | 8 |
| | | Niobium oxide | — | — | 1 | — | — | — | — | — |
| Organic rust preventive | | Thiocarbonyl group-containing compound* | 22 | 10 | 15 | — | 26 | 35 | 22 | — |
| | | Sodium dimethyldithiocarbamate | 5 | — | 5 | 8 | — | — | 5 | — |
| | | 1,2-Bis(2-hydroxyethylthio)ethane | — | 5 | — | — | 5 | 5 | — | — |

Numerical values being solid matter mass proportions (%).
*A compound of the general formula (2) having a weight average molecular weight of 10,000.

EXAMPLES 1 TO 8 AND COMPARATIVE EXAMPLES 1 TO 5

Test sheets were produced according to the conditions (original sheet species, zinc phosphate treatment bath, coating weight of the zinc phosphate coating, post-treatment composition, coating weight of the post-treatment coating) specified in Table 4. The original sheets used were the EG20 or GI70 sheets specified in Table 1, the zinc phosphate treatment baths used were the baths Nos. 1 to 3 specified in Table 2 (no zinc phosphate treatment was carried out in Comparative Example 1), and the post-treatment compositions used were the compositions Nos. 1 to 8 specified in Table 3. As for the coating weights after zinc phosphate treatment, the zinc phosphate coatings were dissolved with chromic acid and the coating weights were calculated based on the differences in weight between before and after dissolution. The post-treatment compositions were respectively applied to the sample sheets after zinc phosphate treatment, and the coated sheets were dried at a peak metal temperature of 80° C. and then allowed to stand for cooling.

boiling water for 30 minutes, then taken out, allowed to stand for 1 day, given lattice pattern cuts at 1-mm intervals, and further drawn to 7 mm in depth by the Erichsen tester, followed by peeling with a adhesive tape. The evaluation criteria were as follows:

Excellent: No peeling;

Fair: Peeling around cuts;

Poor: Peeling.

The results of the above evaluations are shown in Table 4.

TABLE 4

|  |  | Zinc-plated steel sheet | Zinc phosphate treatment | | Post-treatment | | Corrosion resistance, SST | Corrosion resistance after degreasing, SST | Coating adhesion, secondary bond |
|---|---|---|---|---|---|---|---|---|---|
|  |  |  | No. | Coating weight g/m² | No. | Coating weight g/m² |  |  |  |
| Example | 1 | EG20 | 1 | 1.5 | 1 | 0.25 | Excellent | Excellent | Excellent |
|  | 2 | EG20 | 1 | 1.5 | 2 | 0.25 | Excellent | Excellent | Excellent |
|  | 3 | EG20 | 1 | 1.5 | 3 | 0.25 | Excellent | Excellent | Excellent |
|  | 4 | EG20 | 1 | 1.5 | 4 | 0.25 | Excellent | Excellent | Excellent |
|  | 5 | EG20 | 1 | 1.5 | 5 | 0.25 | Excellent | Excellent | Excellent |
|  | 6 | EG20 | 2 | 1 | 2 | 0.05 | Excellent | Excellent | Excellent |
|  | 7 | GI70 | 3 | 0.7 | 3 | 0.1 | Excellent | Excellent | Excellent |
|  | 8 | EG20 | 1 | 1.5 | 1 | 1 | Excellent | Excellent | Excellent |
| Comparative Example | 1 | EG20 | — | — | 1 | 0.25 | Poor | Poor | Poor |
|  | 2 | EG20 | 1 | 1.5 | — | — | Poor | Poor | Poor |
|  | 3 | EG20 | 1 | 1.5 | 6 | 0.25 | Fair | Poor | Poor |
|  | 4 | EG20 | 1 | 1.5 | 7 | 0.25 | Excellent | Poor | Excellent |
|  | 5 | EG20 | 1 | 1.5 | 8 | 0.25 | Poor | Poor | Excellent |

Based on the differences in weight between before and after application, the coating weights of the post-treatment coating were calculated.

(Methods of Evaluating Typical Performance Characteristics)

<Corrosion Resistance>

The edges and reverse side of each sample were tape-sealed, and the sample was subjected to Salt spray test(SST, JIS Z 2371). After the lapse of 72 hours, the state of white rust formation was observed. The evaluation criteria were as follows:

Excellent: No white rust formation;

Fair: Less than 10% covered with white rust;

Poor: 10% or more covered with white rust.

<Corrosion Resistance After Degreasing>

The edges and reverse side of each sample were tape-sealed, and the sample was degreased with a commercial alkaline degreasing solution (pH=12.5, 40° C., 1 minute of dipping) and then subjected to SST (JIS Z 2371). After the lapse of 72 hours, the state of white rust formation was observed. The evaluation criteria were as follows:

Excellent: No white rust formation;

Fair: Less than 10% covered with white rust;

Poor: 10% or more covered with white rust.

<Coating Adhesion>

Each sample was degreased with a commercial alkaline degreasing solution (pH=10.5, 40° C., 1 minute of dipping) and then coated with a melamine alkyd paint (Superlac 100, product of Nippon Paint Co., Ltd.) to a dry film thickness of 30 µm, and baking was carried out at 120° C. for 25 minutes. After 24 hours of standing, the sample was immersed in

EXAMPLES 9 TO 14 AND COMPARATIVE EXAMPLES 6 TO 8

Test sheets were produced according to the conditions (original sheet species, zinc phosphate treatment bath, coating weight of the zinc phosphate coating, magnesium/phosphorus weight ratio, amount of Mg, post-treatment composition, coating weight of the post-treatment coating) specified in Table 5. The original sheets used were the EG30 or GI70 sheets specified in Table 1, the zinc phosphate treatment baths used were the baths Nos. 3 and 4 specified in Table 2, and the post-treatment compositions used were the compositions Nos. 1, 3, 5, 6, 7 and 8 specified in Table 3. As for the coating weights and compositions of the zinc phosphate coatings, the zinc phosphate coatings were dissolved with chromic acid, quantitations were made by ICP analysis and calculations were made. The post-treatment compositions were respectively applied to the sample sheets after zinc phosphate treatment, and the coated sheets were dried at a peak metal temperature of 150° C., then cooled with water, dried and allowed to stand. Based on the differences in weight between before and after application, the coating weights of the post-treatment coating were calculated.

(Methods of Evaluating Typical Performance Characteristics)

<Corrosion Resistance>

Each sample was tape-sealed at the edges and on the reverse side, given crosscuts (cuts reaching the steel face) with a cutter and subjected to Cyclic corrosion test (CCT). After 15 cycles, the state of red rust formation was observed.

[CCT Conditions]

Each cycle comprised 6 hours of salt spraying (5% NaCl, 35° C.)→3 hours of drying (50° C., 45% RH)→14 hours of wetting (50° C., 95% RH)→1 hour of drying (50° C., 45% RH). This cycle was repeated.

The evaluation criteria were as follows:
Excellent: No red rust formation;
Fair: Red rust formation from around cuts;
Poor: Red rust formation all over the surface.

<Corrosion Resistance After Degreasing>

Each sample was tape-sealed at the edges and on the reverse side, given crosscuts (cuts reaching the steel face) with a cutter, degreased with a commercial alkaline degreasing solution (pH=12.5, 40° C., 1 minute of dipping) and then subjected to CCT. After 15 cycles, the state of red rust formation was observed. The CCT conditions were the same as in the above corrosion resistance evaluation.

The evaluation criteria were as follows:
Excellent: No red rust formation;
Fair: Red rust formation from around cuts;
Poor: Red rust formation all over the surface.

<Coating Adhesion>

Each sample was degreased with a commercial alkaline degreasing solution (pH=10.5, 40° C., 1 minute of dipping), and subjected to chemical conversion treatment for automobiles (SURFDINE 2500 MZL, product of Nippon Paint Co., Ltd.) and then to cationic electrodeposition coating for automobiles (V 20, product of Nippon Paint Co., Ltd., 20 $\mu$m, 170° C., 20 minutes of baking). After 24 hours of standing, the sample was immersed in warm water at 50° C. and, after the lapse of 10 days, taken out, given lattice pattern cuts at 2-mm intervals, and drawn to 7 mm in depth by the Erichsen tester, followed by peeling with a tape. The evaluation criteria were as follows:
Excellent: No peeling;
Fair: Peeling around cuts;
Poor: Peeling.

The results of the above evaluations are shown in Table 5.

The test sheets obtained by using EG20 and the zinc phosphate treatment baths Nos. 1 and 2 (Examples 1 to 6 and 8) were excellent in the respective performance characteristics. Even when EG30 sheets were used, the use of the zinc phosphate treatment baths Nos. 3 and 4 (Examples 9 to 11, 13 and 14) made it possible to obtain coated sheets excellent in the respective performance characteristics. Further, when GI70 sheets were used (Examples 7 and 12), coated sheets excellent in the respective performance characteristics could be obtained as well. On the contrary, the test sheets obtained in the comparative examples were not excellent in all of the performance characteristics.

The invention claimed is:

1. A treated zinc-plated steel sheet, comprising:
   a zinc-plated steel sheet;
   a first coating of zinc phosphate, in a coating weight of 0.3 to 5 g/m$^2$, on the zinc-plated steel sheet surface, and
   a second coating on said first coating, in a coating weight of 0.01 to 1 g/m$^2$, containing an organic resin (A), a zirconium compound (B), an inorganic corrosion inhibitor (C) and an organic corrosion inhibitor (D);
   wherein said second coating has the following composition:
   10 to 70% by weight of the organic resin (A),
   3 to 30% by weight of the zirconium compound (B),
   10 to 50% by weight of the inorganic corrosion inhibitor (C) and
   2 to 40% by weight of the organic corrosion inhibitor (D).

2. The treated zinc-plated steel sheet according to claim 1, wherein said organic corrosion inhibitor (D) is at least one species selected from the group consisting of thiocarbonyl group-containing compounds, sulfide group-containing compounds and guanidyl group-containing compounds.

3. The treated zinc-plated steel sheet according to claim 1, wherein said organic resin (A) is an epoxy resin and/or a modified epoxy resin.

4. The treated zinc-plated steel sheet according to claim 3, wherein said inorganic corrosion inhibitor (C) is at least one species selected from the group consisting of silica particles, phosphoric acid compounds and niobium compounds.

5. The treated zinc-plated steel sheet according to claim 3, wherein said organic corrosion inhibitor (D) is at least one species selected from the group consisting of thiocarbonyl group-containing compounds, sulfide group-containing compounds and guanidyl group-containing compounds.

TABLE 5

| | | Zinc phosphate treatment | | | | Post-treatment | | Performance characteristic | | |
|---|---|---|---|---|---|---|---|---|---|---|
| | Zinc-plated steel sheet | No. | Coating weight g/m$^2$ | Mg/P mass ratio | Amount of Mg mg/m$^2$ | No. | Coating weight g/m$^2$ | Corrosion resistance, CCT | Corrosion resistance after degreasing, CCT | Coating adhesion, secondary bond |
| Example | 9 EG30 | 3 | 1.2 | 0.28 | 46 | 1 | 0.25 | Excellent | Excellent | Excellent |
| | 10 EG30 | 3 | 0.7 | 0.27 | 26 | 1 | 0.25 | Excellent | Excellent | Excellent |
| | 11 EG30 | 4 | 1.4 | 0.11 | 21 | 3 | 0.25 | Excellent | Excellent | Excellent |
| | 12 GI70 | 4 | 1.5 | 0.11 | 24 | 3 | 0.25 | Excellent | Excellent | Excellent |
| | 13 EG30 | 4 | 1.4 | 0.11 | 21 | 5 | 0.5 | Excellent | Excellent | Excellent |
| | 14 EG30 | 4 | 1.4 | 0.11 | 21 | 5 | 1 | Excellent | Excellent | Excellent |
| Comparative Example | 6 EG30 | 4 | 1.4 | 0.11 | 21 | 6 | 0.25 | Fair | Poor | Poor |
| | 7 EG30 | 4 | 1.4 | 0.11 | 21 | 7 | 0.25 | Fair | Poor | Excellent |
| | 8 EG30 | 4 | 1.4 | 0.11 | 21 | 8 | 0.25 | Poor | Poor | Excellent |

6. The treated zinc-plated steel sheet according to claim 1, wherein said inorganic corrosion inhibitor (C) is at least one species selected from the group consisting of silica particles, phosphoric acid compounds and niobium compounds.

7. The treated zinc-plated steel sheet according to claim 6, wherein said organic corrosion inhibitor (D) is at least one species selected from the group consisting of thiocarbonyl group-containing compounds, sulfide group-containing compounds and guanidyl group-containing compounds.

8. The treated zinc-plated steel sheet according to claim 1, wherein said zinc phosphate coating contains magnesium, the magnesium/phosphorus (weight ratio) in said zinc phosphate coating being not less than 0.1 and the amount of magnesium being not less than 20 mg/m$^2$.

9. The treated zinc-plated steel sheet according to claim 8, wherein said organic resin (A) is an epoxy resin and/or a modified epoxy resin.

10. The treated zinc-plated steel sheet according to claim 8, wherein said inorganic corrosion inhibitor (C) is at least one species selected from the group consisting of silica particles, phosphoric acid compounds and niobium compounds.

11. The treated zinc-plated steel sheet according to claim 8, wherein said organic corrosion inhibitor (D) is at least one species selected from the group consisting of thiocarbonyl group-containing compounds, sulfide group-containing compounds and guanidyl group-containing compounds.

* * * * *

UNITED STATES PATENT AND TRADEMARK OFFICE
CERTIFICATE OF CORRECTION

PATENT NO.        : 7,011,895 B2
APPLICATION NO.   : 10/874755
DATED             : June 9, 2006
INVENTOR(S)       : Kiyokazu Ishizuka et al.

It is certified that error appears in the above-identified patent and that said Letters Patent is hereby corrected as shown below:

<u>Title page,</u>
Item (73) --   Assignee
Add second assignee --Nippon Paint Co., Ltd., Osaka (JP)--

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

PATENT NO.       : 7,011,895 B2
APPLICATION NO.  : 10/874755
DATED            : March 14, 2006
INVENTOR(S)      : Kiyokazu Ishizuka et al.

It is certified that error appears in the above-identified patent and that said Letters Patent is hereby corrected as shown below:

<u>Title page,</u>
Item (73) --  Assignee
Add second assignee --Nippon Paint Co., Ltd., Osaka (JP)--

This certificate supersedes Certificate of Correction issued March 20, 2007.

Signed and Sealed this

Tenth Day of April, 2007

JON W. DUDAS
*Director of the United States Patent and Trademark Office*